July 28, 1970  A. W. ECKSTROM ET AL  3,521,605

FORCED RECIRCULATION EVAPORATOR

Filed July 5, 1968  3 Sheets-Sheet 1

INVENTORS
Albert W. Eckstrom
Edward S. Wright
William G. Dedert
Reynard W. Gingrich
BY
Sommer + Weber
ATTORNEYS July 28, 1970
A. W. ECKSTROM ET AL
3,521,605
FORCED RECIRCULATION EVAPORATOR
Filed July 5, 1968
3 Sheets-Sheet 2
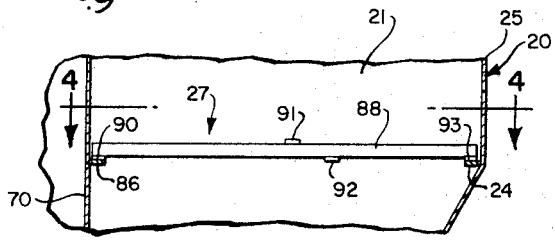
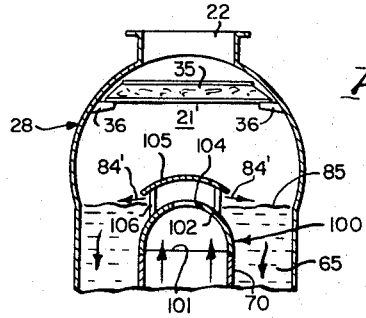
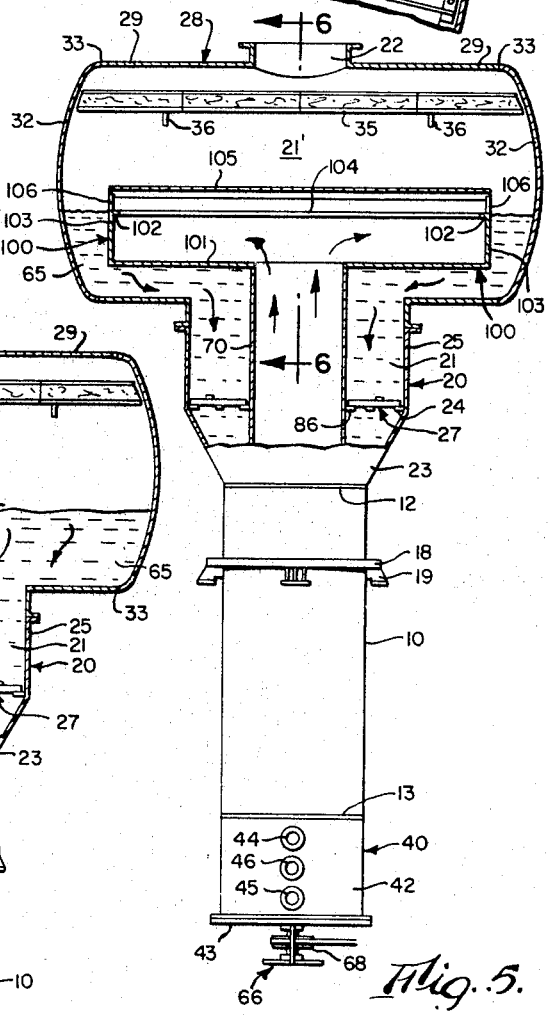
INVENTORS
Albert W. Eckstrom
Edward S. Wright
William G. Dedert
Reynard W. Gingrich
BY
Sommer & Weber
ATTORNEYS

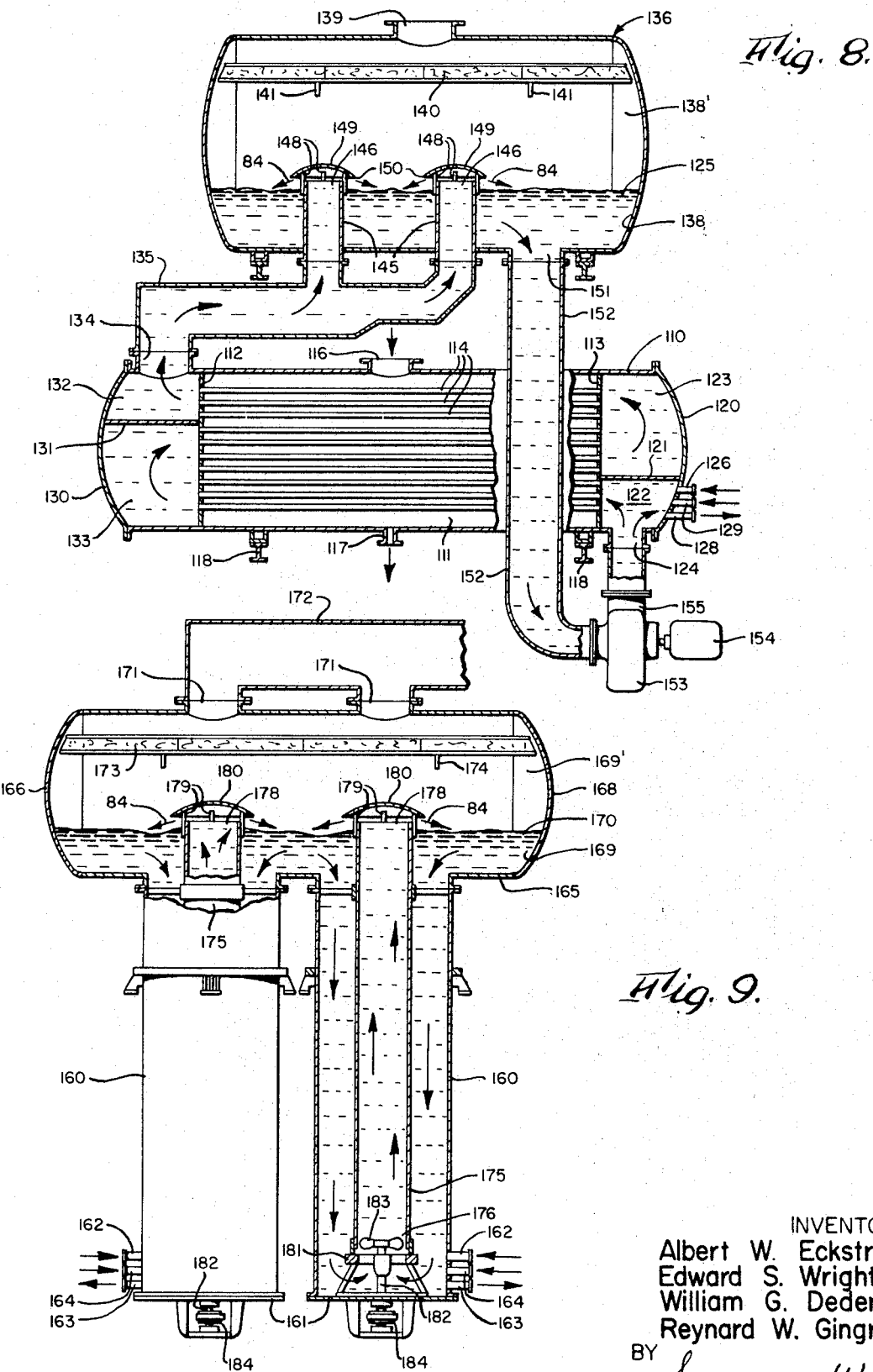

United States Patent Office 3,521,605
Patented July 28, 1970

3,521,605
FORCED RECIRCULATION EVAPORATOR
Albert W. Eckstrom, Snyder, N.Y., Edward S. Wright, Mount Lebanon, Pa., William G. Dedert, Crete, Ill., and Reynard W. Gingrich, Fort Erie, Ontario, Canada, assignors to Blaw-Knox Company, Pittsburgh, Pa., a corporation of Delaware
Filed July 5, 1968, Ser. No. 742,726
Int. Cl. F22b 1/02
U.S. Cl. 122—34         13 Claims

ABSTRACT OF THE DISCLOSURE

The purpose is to avoid important disadvantages in field fabrication of high capacity evaporators, which include not only heated evaporators but also crystallizers in which crystallization is effected by vacuum cooling. This purpose is accomplished by providing shop assembled units of a size capable of normal handling by common carriers, so that the field work is merely that of joining the units together. In particular the shell providing vapor disengagement is a horizontal drum of a normal shippable diameter and the liquor is discharged under pump pressure into the vapor space therein at different places horizontally along the drum. Preferably such discharge is in the form of a rapid horizontally moving film or films immediately above the liquor level maintained in the drum (1) to permit of minimum but adequate vapor and liquor space depth and hence the use of such small diameter drum (2) to rapidly disengage or flash vapor from the film or films, (3) to rapidly bring the film to equilibrium with, however, insufficient time for the liquor in the film to come to supersaturation with consequent excessive nascent minute crystal propagation and (4) in a volume sufficient to recirculate the crystals and promote growth thereof. The liquor so forceably discharged into the vapor space can be from a horizontal tube or tubes arranged lengthwise in the drum at least partly submerged in the liquor therein and the discharge can be in the form of a plurality of films at spaced intervals along said tube or as a film or films discharged from a slot extending lengthwise of the tube. In a modified form the film or films so discharged into the vapor space can be supplied from a plurality of shell and tube steam chest heaters or crystallizer shells. The steam chest heater or crystallizer shell can be upright or horizontal and the pump producing such forced discharge can be internal or external.

Figures 1, 2:
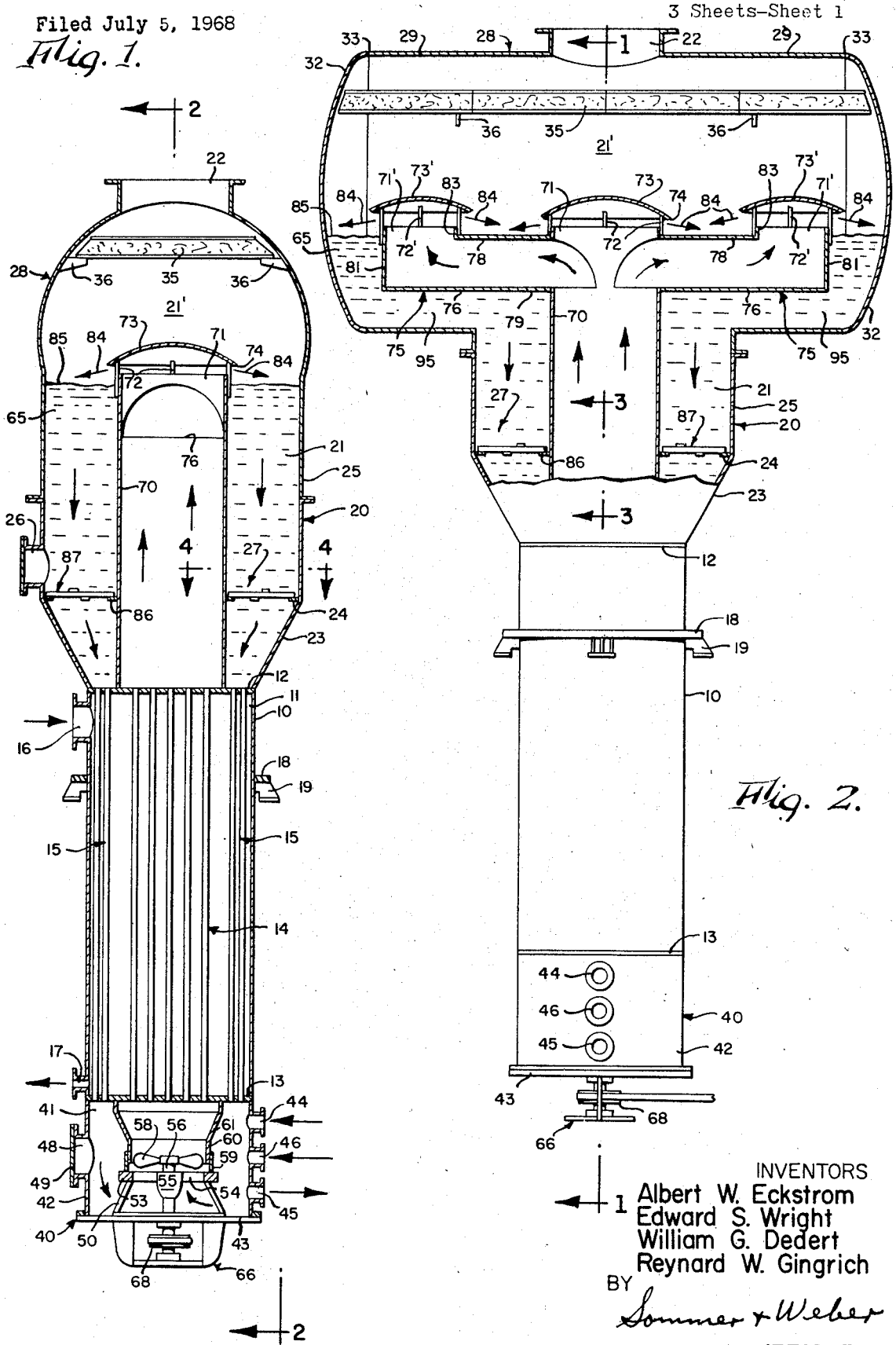

In the accompanying drawings, FIG. 1 is a vertical longitudinal central section through one form of a forced recirculation evaporator embodying the present invention. FIG. 2 is a vertical section taken generally on line 2—2, FIG. 1, parts being shown in elevation. FIG. 3 is a fragmentary enlarged vertical transverse section taken on line 3—3, FIG. 2. FIG. 4 is a fragmentary horizontal section taken on lines 4—4, FIGS. 1 and 3. FIG. 5 is a vertical section similar to FIG. 2 showing a modified form of the invention. FIG. 6 is a fragmentary vertical section taken generally on line 6—6, FIG. 5. FIG. 7 is a vertical section similar to FIGS. 2 and 5 and showing a further modified form of the invention. FIG. 8 is a vertical section similar to FIGS. 2, 5 and 7 and showing a further modified form of the invention. FIG. 9 is a vertical section similar to FIGS. 2, 5, 7 and 8 and showing the invention embodied in a vacuum crystallizer.

FIGS. 1–4

Referring to FIGS. 1–4, the numeral 10 represents a vertical tubular cylindrical shell forming a steam chest 11 enclosed by upper and lower horizontal tube sheets 12, 13 across the shell. A central bundle of upflow tubes 14 connect and extend through these tube sheets, the outer upflow tubes of this central bundle being in circular arrangement. These are surrounded by an outer bundle of downflow tubes 15 connecting and extending through these two tube sheets. The steam chest 11 has the usual top steam inlet 16 and a bottom condensate outlet 17. Since the invention is particularly directed to very large capacity evaporators composed of smaller units which can be shop fabricated and shipped by common carriers and easily assembled at the site, the evaporator is shown as having a large heavy mounting ring 18 embracing and secured to the exterior of the steam chest shell 10 and having a plurality of feet 19 adapted to be bolted down on a supporting structure (not shown).

Means 20 provide a liquor and vapor space 21, 21' above the upper tube sheet 12 the liquor space being designated at 21 and the vapor space being designated at 21' and which means has a top vapor outlet 22. Such means is shown as comprising an upwardly enlarging frusto-conical section 23 extending upwardly from the upper rim of the steam chest shell 10. An internal grid supporting ring 24 is provided at the upper end of this frusto-conical section and an upright cylindrical section 25 forms an extension of the top rim of this frusto-conical section. Immediately above the grid mounting ring, the upwardly cylindrical extension 25 is provided with a manhole 26 having a conventional cover, this manhole being sufficiently large for the removal and insertion sections of the grid 27 supported on the ring 24, as hereinafter described.

This upright cylindrical extension 25 supports and opens into the center of a horizontal tubular shell or drum 28 having coaxial branch extensions 29 at its opposite ends which extend horizontally beyond the cylindrical support 25 and the steam chest shell 10. The outboard end of each branch extension 29 is enclosed by an end head 32 which can be shop welded to the end rim of the branch extension 29 indicated at 33. It will be seen that even with very large evaporators the horizontal drum-shaped tubular body 28, branch extensions 29 and end heads 32 can be shop fabricated at lower cost, under better control and with resulting higher quality as compared with fabricating any of these units in the field, it being an important object of the invention to permit such shop fabrication of all the units of very large evaporators and leaving the field operation essentially as one of connecting together the shop fabricated units.

One or more vapor outlets 22 can be provided in the central horizontal drum-shaped section 28 and its extensions 29 and escape of entrained liquor with the vapor going out through the outlet or outlets 22 is inhibited in any suitable manner, as by a horizontal bed 35 of metal mesh suitably supported by brackets 36 to provide a barrier across and block the top of the vapor space 21', this barrier serving to catch entrained liquor, which drips back into the liquor space 21.

Means 40 provide a liquor space 41 below the bottom tube sheet 13 for transfering liquor from the bottom of the downflow tubes 15 to the bottom of the upflow tubes 14. This liquor transfer means comprises a vertical cylindrical shell 42 having its upper edge suitably fixed to and forming a continuation of the lower rim of the steam chest shell 10 and provided at its lower end with a bottom end head 43. This cylinder is provided with a liquor inlet 44, liquor outlet 45 and can also be provided with a water inlet 46 for washing and desalting the walls of the evaporator. This cylinder 42 can also be provided with a manhole 48 and cover 49.

Mounted on the bottom end head 43 by means of upstanding legs 50 is a ring 53 having spokes 54 supporting a central hub 55 in which a vertical propeller shaft 56 is journalled for rotation about a vertical axis. This propeller shaft carrier an airplane-type propeller 58 fixed thereto about the spoked supporting plate 53 and this propeller rotates in a cylindrical shroud 59 rising from spoked ring 53. This shroud embraces a reduced depending neck 60 the upper edge of which is connected by an upwardly enlarged frusto-conical shell 61 to that circular portion of the tube plate 13 which separates the central upflow tubes 14 from the surrounding downflow tubes 15.

The propeller 58 can be driven in any suitable manner to drive the liquor 65 up the central bundle of upflow tubes 14. For this purpose the shaft 56 is shown as extending through the bottom end head 43 and as journalled at its lower end in a supporting structure 66 projecting downwardly from this end head. At its extreme lower head this propeller shaft 56 can be driven by means of a pulley 68 or in any other suitable manner.

The central bundle of upflow tubes 14 discharges into an upright tubular duct 70 which extends upwardly from that portion of the upper tube sheet 12 which separates the central bundle of upflow tubes 14 from the surrounding downflow tubes 15. This upright duct 70 extends through the liquor space 21. This upright tubular duct 70 is open at its upper end, as indicated at 71, and around this opening has a plurality of upstanding bars 72 fixed thereto and also fixed to and supporting a concave baffle or body 73 the concave side of which faces downwardly. The baffle, with the form of the invention shown in FIGS. 1–4 is of shallow dome-shaped form with its edges 74 extending horizontally beyond the sides of the opening 71.

To provide an evaporator of extremely high capacity, while at the same time employing units which can be readily shop fabricated and shipped normally in common carriers to the field for simple coupling together, the upright duct 70 is shown as having two horizontal branches 75 projecting in opposite directions into the extensions 29 of the drum-shaped horizontal top part 28 of the evaporator. These branches are of tubular form and preferably are of D-shape in cross section, having flat bottoms 76 and semicylindrical tops 78, the flat bottoms being for the purpose of providing a space for rapid return of the liquor 65 without crystal settlement, from the top of the body of liquor 65 in the horizontal drum 28 and its extensions 29, to the downflow tubes 15 for recirculation. Each branch has its inboard end connected to and communicating with the interior of the upright duct 70 and has an outer D-shaped end head 81.

The outboard end of each branch 75 is provided with a top opening 71' preferably surrounded by an upwardly projecting neck 83 to which upstanding bars 72' are secured to support a dome-shaped baffle 73' similar to the baffle 73.

The branches 75 are shown as at least in part immersed in the liquor 65, the level of which is just below the openings 71 and 71'. The action of the dome-shaped baffle 73, 73' is such as to each deflect an annular film, indicated by the arrows 84, horizontally outwardly and downwardly against the surface 85 of the body of liquid 65 so as to effect rapid vapor disengagement from the film 84 into the vapor space 21' with sufficient time to bring the liquor in the film to equilibrium but with insufficient transit time of the film the liquor in this film 84 to come to supersaturation and the resultant production of minute crystals. Also the horizontal outwardly and downwardly inclined angle of the film 84 deflected by the dome-shaped baffles 73, 73' such that each film is directed against the surface 85 of the body of liquor 65 with a rolling action and with minimum churning effect on the body of liquor 65, this churning being important only with salting materials.

The bar grid 27 is supported at its inner end by a supporting ring 86 fixed to the exterior of the upright duct 70 in the same horizontal plane as the companion supporting ring 24. The bar grid 28 completely bridges and fills the space between 70 and 25 and is composed of a plurality of wedge-shaped units 87 in plan, each, FIGS. 3 and 4, composed of a plurality of radiating full length and half length bars 88, 89 welded to short cross bars 90, 91, 92, 93, of which the innermost and outermost 90, 93 can be secured by bolts 94 to the supporting rings 86, 24, respectively. Each wedge-shaped unit 87 is sufficiently narrow at its wider outer horizontal end to be passed through the manhole 26.

OPERATION FIGS. 1–4

With the form of the invention shown in FIGS. 1–4, steam from 16 is supplied to the steam chest 11 to heat the exterior of both the downflow tubes 15 and upflow tubes 14. The liquor 65 to be concentrated is introduced at 44 and is forced by the propeller 58 to flow up the bundle of upflow tubes 14, through the upright duct 70, and also horizontally outwardly through the horizontal branches 75 of the upper end of this upward extension 70. This liquor 65, heated by passage through the upflow tubes 14, and downflow tubes 15 as hereinafter described, is forced upwardly from the openings 71, 71' upwardly against the concave or dome-shaped baffles 73, 73' which deflect the liquor so as to be discharged outwardly from their outer edges in a horizontal downwardly directed direction in the form of films designated by the arrows 84. These films provide vapor disengagement or flashing therefrom, and their time of being in the form of films is sufficient for the liquor in the films to come to equilibrium but is sufficiently short so that the films engage the surface 85 of the body of liquor 65 before reaching supersaturation and hence before fine nascent crystals are formed in profusion. With salt liquors, these films engage the surface 85 with a rolling rather than a churning action, and hence the liquid from these films 84 is immediately incorporated with the body of liquor 65 and this liquor, together with contained crystals, is swept along the bottom of the horizontal extensions 29 of the horizontal drum-shaped part 28 of the evaporator into the upright tube part 25 of the evaporator thereby to insure the sweeping of crystals along the bottom of the horizontal extensions 29 providing the upper part of the liquor space 21. The bottoms 76 of the horizontal branches 75 are flat in cross section so that large cross sectional areas 95 are provided below these branches 75. The liquor and crystals thereupon travel down through the bar grid 27 and into the upper ends of the downflow tubes 15 from which they enter the liquor space 41 at the bottom of the evaporator for recirculation by the propeller 58.

If agglomerates or large lumps of salt form these are collected on the bar grid 27. They can be dissolved, along with other salt adhering to the concentrator walls, by draining the evaporator, refilling it with wash water at 46 and running it with such wash water.

As previously indicated, the principal purpose of the horizontal extensions 29 of the upper horizontal drum-shaped casing member 28 and also the branches 75 of the upright duct 70 from the bundle of upflow tubes 14, together with the three liquid discharge openings 71 and 71' is to permit very large evaporators to be shop fabricated in units which are small enough to be transported by railroads and trucking companies. Thus, the maximum diameters of the larger cylindrical components, such as the horizontal top drum 28, its extensions 29, and the upward extension 25 of the steam chest shell 10 can be held not to exceed 13½ feet. Such sections can be easily shipped to the site. In the field or at the place of use, these sections, together with the other units of the apparatus, can be joined together by welding or otherwise. As a result the essential critical and important fabrication is done in the shop under properly controlled conditions to produce a low-cost, high-quality product and the disadvantages of field fabrication so far as the size, shape and fit of the parts is avoided.

FIGS. 5 AND 6

With the form of the invention shown in FIGS. 5 and 6, the shell and tube heat steam chest of the forced recirculation evaporator is the same as that shown in FIGS. 1–4 and hence the same reference numerals have been employed and their description will not be repeated.

However, the upper end of the upright duct 70 from the bundle of upflow tubes 14 is shown as discharging into the bottom of a pair of horizontal tubular branches 100 which extend longitudinally along the interior of the liquor and vapor space 21, 21' in the horizontal drum-shaped upper part 28 and its extensions 29. These tubular branches 100 are in the form of a horizontal tube of preferably D-shaped form in cross section with a flat bottom 101 and semicylindrical top 102 and is closed at its ends by means of end heads 103.

For the release of liquor from the horizontal tube formed by the branches 100, it is provided with a longitudinal slot 104 along its top. This is covered by a concave, inverted trough-shaped baffle 105 supported in spaced relation above the tube 100 by means of upstanding bars or legs 106.

As with the form of the invention shown in FIGS. 1–4, the liquor forced upwardly into the horizontal tube formed by the branches 100, and which extends longitudinally along the drum-shaped upper part 28 and its extensions 29 of the evaporator shell, is discharged upwardly through the slot 104 where it strikes the baffle 105 to be deflected horizontally outwardly and downwardly, as indicated by the arrows 84', in the form of films. The vapor from these films is rapidly disengaged or flashed into the vapor space 21', but the travel of the films is in such short length of time that the liquor therein cannot reach supersaturation and form fine nascent crystals, although the transit time is sufficient for the liquor in the film to come to equilibrium. Further, this film engages the surface 85 of the body of liquor 65 with a rolling rather than a churning action so that the film and crystals contained therein are rapidly carried along the bottom of the horizontal drum-shaped top structure 28, 29, 32 and back to the upper inlet ends of the downflow tubes 15. As a result, crystals are recirculated through the apparatus with a minimum of new crystal formation and a maximum growth of recirculated crystals.

FIG. 7

The form of the invention shown in FIG. 7 differs from the other forms in that a plurality of forced circulation shell and tube steam chests 10, 14, 15 are employed to serve a single horizontal drum 28, 29, 32 forming the top of the means 20 providing the liquor and vapor space 21, 21' above the upper tube sheet 12 of the drum. As with the form of the invention shown in FIGS. 1–4, the liquor forced up through the upright duct 70 from the bundle of upflow tubes 14 of the shell and tube steam chest and passing out through the open top 71 thereof strikes the dome-shaped baffle 73 held in spaced relation above this opening to form the issuing liquor into a horizontally outwardly and rapidly moving film 84 which flashes its vapor to the surrounding vapor space 21' without coming to supersaturation and is directed downwardly as to have a rolling, rather than a churning action, against the surface 85 of the body of liquor 65.

Since, except for the use of a multiplicity of shell and tube steam chests 10, 14, 15, the form of the invention shown in FIG. 7 is identical to that shown in FIGS. 1–4, the same reference numerals have been employed and the description will not be repeated.

FIG. 8

FIG. 8 illustrates the manner in which the invention can be applied to an evaporator having a horizontal steam chest and also having an external pump for effecting the required forced circulation.

Thus, the numeral 110 represents a horizontal tubular cylindrical shell forming a steam chest 111 closed by vertical tube sheets 112, 113 across the shell. Horizontal tubes 114 connect and extend through these tube sheets. The steam chest 111 has the usual top steam inlet 116 and bottom condensate outlet 117. The shell 110 is shown as supported by beams 118.

The shell 110 extends beyond the tube sheet 113 and is provided with an end head 120, a horizontal partition 121 between this end head and the tube sheet 113 providing an inlet chamber 122 and a return chamber 123, the inlet chamber being provided with a large inlet 124 for the recirculating liquor 125 and also being provided with a fresh material liquor inlet 126. A liquor outlet 128 can also be provided together with a wash water inlet 129 for washing and desalting the walls of the system.

The shell 110 extends beyond the opposite tube sheet 112 and is provided with an end head 130 from which a horizontal partition 131 extends to the tube sheet 112 to provide an outlet chamber 132 and an intermediate chamber 133, the outlet chamber being provided with an outlet 134 connecting with a tube means or conduit 135 which extends horizontally under a second horizontally elongated cylindrical shell 136.

This shell 136 provides a liquor space designated at 138 and a vapor space indicated at 138', the vapor space being provided with one or more outlets 139. Escape of entrained liquor with the vapor going out through the outlet or outlets 139 is inhibited in any suitable manner, as by a horizontal bed 140 of metal mash suitably supported by brackets 141 to provide a barrier across and block the vapor space 138', this barrier serving to catch entrained liquor which drips back into the liquor space 138.

The horizontal tube means or conduit 135 discharges into the bottom of a pair of upright tubular ducts 145 which extend upwardly through the bottom of the horizontal tubular shell 136 through the liquor space 138 and into the vapor space 138'. Each upright tubular duct 145 is open at its upper end as indicated at 146, and around this opening has a plurality of upstanding bars 148 fixed thereto and also fixed to and supporting a concave baffle or body 149 the concave side of which faces downwardly. This baffle is similar to the baffle 73 in the form of the invention shown in FIGS. 1–4 and 7, and functions in the same manner, the baffle 149 being of similar dome-shape form with its edges 150 extending beyond the sides of the corresponding opening 146 and being spaced above but in close proximity to the surface of the body of liquor 125 contained within the shell 136.

The liquor outlet from the shell 136 is designated at 151 and is connected by an external duct 152 with the inlet of a pump 153 driven by a motor 154. The outlet 155 of the pump 153 is connected to the recirculating liquor inlet 124 of the steam chest shell 110.

As with the form of the invention shown in FIGS. 1–4 the liquor forced upwardly through the upright ducts 145 and passing out through the open tops 146 thereof strikes the dome-shaped baffles 149 held in spaced relation above this opening to form the issuing liquor into a horizontally outwardly and rapidly moving film 84 which flashes its vapor to the surrounding vapor space 138' with sufficient time for the liquor on this film to come to equilibrium but with insufficient time for the liquor in this film to come to supersaturation and develop minute nascent crystals. This film is also directed against the surface of the body of liquor 125 in the shell 136 to have a rolling rather than a churning action, this being important where a salt is involved.

The liquor 125 in the shell 136 is withdrawn through the duct 152 into the inlet of the pump 153 which forces it into the inlet chamber 122 of the steam chest shell 110. From this chamber it passes through the bottom tubes 114 of the steam chest into the intermediate chamber 133 where it is returned by other of these tubes to the intermediate chamber 123. From this last chamber it is returned by the top bundle of tubes 114 to the outlet chamber 132 from which it is forced, via the horizontal tube means or conduit 135 back into the upright tubular ducts 145.

FIG. 9

FIG. 9 illustrates the manner in which the invention can be applied to a vacuum crystallizer.

The numeral 160 represents one of a pair of vertical shells each of which is closed at its lower end by an end head 161 and into the bottom of which the liquor to be crystallized is admitted at 162 and the product withdrawn at 163 a line 164 also being provided for supplying wash water. The upper end of each shell 160 opens into the bottom of a horizontal shell 165 having end heads 166, 168, this shell and end heads providing a liquor space 169 containing a body of liquor 170 which also fills each of the shells 160, and a vapor space 169'. Outlets 171 from this vapor space 169' connect with a vacuum line 172. As with the other forms of the invention, the escape of entrained liquor through the outlets 171 is inhibited in any suitable manner as by a horizontal bed 173 of metal mesh suitably supported by brackets 174 across the top of the vapor space 169', this barrier serving to catch entrained liquor which drips back into the liquor space 169.

Within each of the vertical shells 160 is suitably mounted a vertical tube 175 having a lower open end 176 which opens into the body of liquor 170 in the bottom of its vertical shell 160 and which is provided with a top opening 178 which opens into the vapor space 169'. Each of the openings 178 is surrounded by upstanding bars 179 which are secured to and support a baffle 180 similar to the baffles 73 in the form of the invention shown in FIGS. 1–4.

As with the form of the invention shown in FIGS. 1–4 a ring 181 at the bottom of each tube 175 has spokes supporting a central hub in which a propeller shaft 182 is journalled for rotation about a vertical axis. This propeller shaft carries an airplane type propeller 183 fixed thereto and arranged in the bottom 176 of its tube 175. This propeller can be driven in any suitable manner, as by an external pulley 184, to drive the liquor 170 up the central tube 175, the movement of the liquors induced by the propeller 183 being indicated by arrows.

As with the other forms of the invention, the liquor so driven up each tube 175 by the airplane propeller 183 is forced upwardly against the concave or dome-shaped baffles 180 which deflect the liquor so as to be discharged outwardly from their outer edges in a horizontal downwardly direction in the form of films designated by the arrows 84. These films provide vapor disengagement or flashing therefrom and their time of being in the form of films is sufficient for the liquor in the films to come to equilibrium but is insufficient to permit the liquor in the films to reach supersaturation. These films engage the surface of the body of liquor 170 and are immediately incorporated therein and are drawn back into the tops of vertical shells 160, flowing downwardly to be again driven upwardly by the airplane propeller type of pump 183.

By "evaporator" as used in the following claims is meant to include apparatus in which solutions are reduced in moisture content either by heat, as in FIGS. 1–8, or by vacuum cooling, as in the crystallizer, FIG. 9.

We claim:

1. A forced circulation evaporator having a first shell providing a liquor space, a second shell providing a liquor and vapor space, the vapor space having a vapor outlet, tube means adapted to conduct liquor from said liquor space into said liquor and vapor space, and pump means receiving liquor from the body of liquor in one of said liquor spaces and driving it through said tube means toward said liquor and vapor space, wherein the improvement comprises said tube means terminating in said liquor and vapor space in a duct surrounded by said body of liquor in said liquor and vapor space and provided with a top opening for discharging liquor into said vapor space at the liquid-vapor interface and baffle means in said vapor space directly over said top opening and deflecting the liquor issuing from said top opening in the form of a horizontally outwardly moving film along the liquid-vapor interface thereby to rapidly bring the liquor in the film to equilibrium.

2. A forced circulation evaporator as set forth in claim 1 wherein said second shell is horizontally elongated and of tubular form.

3. A forced circulation evaporator having a first shell providing a liquor space, a second shell providing a liquor and vapor space, the vapor space having a vapor outlet, tube means adapted to conduct liquor from said liquor space into said liquor and vapor space, and pump means receiving liquor from the body of liquor in one of said liquor spaces and driving it through said tube means toward said liquor and vapor space, wherein the improvement comprises said second shell being of horizontally elongated tubular form; said tube means terminating in said liquor and vapor space and provided with a top opening for discharging liquor into said vapor; said duct being provided with at least one horizontal tubular branch projecting interiorly lengthwise along said second shell and being at least partly immersed in said body of liquor in said liquor and vapor space, said branch being provided at its outboard end with a second opening for discharging liquor into said liquor and vapor space, and baffle means in said vapor space directly over said top opening and deflecting the liquor issuing from said top opening into said vapor space in the form of a horizontally outwardly moving film thereby to rapidly bring the liquor in the film to equilibrium.

4. A forced circulation evaporator as set forth in claim 3 wherein said baffle means directs said horizontally moving film downwardly against the surface of said body of liquor in said liquor and vapor space to disengage vapor from said film with sufficient time for the liquor in said film to come to equilibrium but with insufficient time for the liquor in the film to come to supersaturation.

5. A forced circulation evaporator as set forth in claim 2 wherein the contact of said film with said surface of said body of liquor in said liquor and vapor space produces a rolling action of said surface and avoids churning of said body of liquor in said liquor and vapor space.

6. A forced circulation evaporator as set forth in claim 3 wherein said baffle means is in the form of a body having a concave underside the outer edges of which project horizontally beyond said top opening, the concave shape of said body serving to direct said film downwardly as well as horizontally.

7. A forced circulation evaporator as set forth in claim 3 wherein said second opening is on top of said branch and additionally including baffle means in said vapor space over said second opening in the outboard end of said branch and deflecting the liquor issuing therefrom into the form of a horizontally outwardly moving film thereby to disengage vapor from said film into said vapor space with sufficient time for the liquor in the film to rapidly come to equilibrium but with insufficient time for the liquor in the film to come to supersaturation.

8. A forced circulation evaporator having a first shell providing a liquor space, a second shell providing a liquor and vapor space, the vapor space having a vapor outlet, tube means adapted to conduct liquor from said liquor space into said liquor and vapor space, and pump means receiving liquor from one of said liquor spaces and driving it through said tube means toward said liquor and vapor space, wherein the improvement comprises said second shell being of horizontally elongated tubular form, a horizontal tube arranged lengthwise in said second shell and at least partly immersed in the body of liquor therein, said horizontal tube being in communication with said tube means to receive liquor therefrom, and outlet means along said horizontal tube and arranged to discharge liquor therefrom into said vapor space in said second shell at different locations lengthwise of said second shell.

9. A forced circulation evaporator as set forth in claim 8 wherein said outlet means is in the form of a plurality of outlets in spaced relation along said horizontal tube.

10. A forced circulation evaporator as set forth in claim 8 wherein said outlet means is in the form of a longitudinal slit extending along said horizontal tube means.

11. A forced circulation evaporator wherein the improvement comprises a first horizontally elongated shell providing a liquor space, a second horizontally elongated shell providing a liquor and vapor space, the vapor space having a vapor outlet, tube means adapted to conduct liquor from said liquor space into said liquor and vapor space, pump means receiving liquor from said second shell and driving it into said first shell and through said tube means back into said second shell, the corresponding end of said tube means projecting into said second shell and being provided with outlet means arranged to discharge liquor from said tube means at different horizontally spaced places along said second shell into the vapor space therein.

12. A forced circulation evaporator having a first shell providing a liquor space, a second shell providing a liquor and vapor space, the vapor space having a vapor outlet, tube means adapted to conduct liquor from said liquor space into said liquor and vapor space, and pump means receiving liquor from the body of liquor in one of said liquor spaces and driving it through said tube means toward said liquor and vapor space, wherein the improvement comprises second shell being of horizontally elongated tubular form and said tube means terminating in said liquor and vapor space in a duct surrounded by said body of liquor in said liquor and vapor space and provided with a top opening for discharging liquor into said vapor space, said duct being provided with at least one horizontal tubular branch projecting interiorly lengthwise along said second shell and is at least partly immersed in said body of liquor in said liquor and vapor space, said top opening being extended horizontally lengthwise along said branch to be in the form of a horizontal slot, and baffle means, in said vapor space directly over said top opening and deflecting the liquor issuing from said top opening into said vapor space in the form of a horizontally outwardly moving film therby to rapidly bring the liquor in the film to equilibrium, said baffle means being in the form of an inverted trough-shaped body extending parallel with and directly above said slot with its longitudinal edges projecting beyond the longitudinal edges of said slot.

13. A forced circulation evaporator wherein the improvement comprises a plurality of first shells providing liquor spaces, a single horizontally elongated second shell providing a liquor and vapor space, the vapor space having a vapor outlet, tube means adapted to conduct liquor from each of said liquor spaces in said first shells into said liquor and vapor space in said second shell, and pump means receiving liquor from one of said liquor spaces and driving it through each of said tube means toward said liquor and vapor space in said second shell, the corresponding end of said tube means projecting into said second shell and being provided with outlet means arranged to discharge liquor from said tube means into said vapor space in said second shell at the liquor-vapor interface, and baffle means in said vapor space over said outlet means deflecting liquor issuing from said outlet means in the form of a horizontally moving film along the liquid-vapor interface to rapidly bring liquid in the film to equilibrium.

References Cited
UNITED STATES PATENTS

| 553,841 | 2/1896 | Cooper | 122—34 XR |
|---|---|---|---|
| 828,524 | 8/1906 | Warren | 122—34 XR |
| 995,776 | 6/1911 | Dunn | 122—34 XR |
| 1,067,010 | 7/1913 | Dunn | 122—34 XR |
| 2,068,094 | 1/1937 | Webre | 159—27 XR |
| 2,229,554 | 1/1941 | Cummings | 122—32 |
| 3,236,748 | 2/1966 | Pottharst | 159—27 XR |

KENNETH W. SPRAGUE, Primary Examiner